(12) United States Patent
Goodwin, III

(10) Patent No.: US 6,601,764 B1
(45) Date of Patent: Aug. 5, 2003

(54) SYSTEM AND METHOD OF MANAGING INVENTORY

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/097,708

(22) Filed: Mar. 13, 2002

(51) Int. Cl.[7] .............................................. G06F 17/60
(52) U.S. Cl. ...................................................... 235/385
(58) Field of Search .................................. 235/383, 385

(56) References Cited

U.S. PATENT DOCUMENTS

| | | | |
|---|---|---|---|
| 4,500,880 A | * | 2/1985 | Gomersall et al. .......... 340/5.91 |
| 4,816,824 A | | 3/1989 | Katz et al. .............. 340/825.34 |
| 4,962,466 A | * | 10/1990 | Revesz et al. ................. 705/14 |
| 5,151,684 A | | 9/1992 | Johnsen ....................... 340/572 |
| 5,239,167 A | | 8/1993 | Kipp .......................... 235/383 |
| 5,504,475 A | * | 4/1996 | Houdou et al. ............. 340/5.91 |
| 6,019,394 A | | 2/2000 | Chenoweth et al. .......... 283/81 |
| 6,256,615 B1 | * | 7/2001 | Goodwin, III ............... 705/20 |
| 2002/0139838 A1 | * | 10/2002 | Goodwin, III .............. 235/375 |
| 2002/0143635 A1 | * | 10/2002 | Goodwin, III ............... 705/22 |
| 2002/0147649 A1 | * | 10/2002 | White ......................... 705/20 |

* cited by examiner

Primary Examiner—Mark Tremblay
(74) Attorney, Agent, or Firm—Paul W. Martin

(57) ABSTRACT

An inventory management system which determines item location and time spent on a shelf. The system includes an electronic shelf label (ESL) system including an ESL, a radio frequency identification (RFID) label interrogator associated with the ESL, RFID labels attached to items associated with the ESL, and a computer. The computer uses the ESL system to activate RFID labels on the items, obtains RFID label information from the RFID labels through the ESL system, and stores the RFID label information in a record. The computer completes repeats the process and compares the latest RFID label information with previous RFID label information to determine which items have been added or removed from the shelf.

8 Claims, 4 Drawing Sheets

SYSTEM AND METHOD OF MANAGING INVENTORY

BACKGROUND OF THE INVENTION

The present invention relates to radio frequency identification devices and electronic price label systems, and more specifically to a system and method of managing inventory.

ESL systems typically include a plurality of ESLs for merchandise items in a transaction establishment. ESLs typically display the price of corresponding merchandise items on store shelves and are typically attached to a rail or shelf channel along the leading edge of the shelves. A transaction establishment may contain thousands of ESLs to display the prices of the merchandise items. The ESLs are coupled to a central server from where information about the ESLs is typically maintained in an ESL data file. Price information displayed by the ESLs is obtained from a price look-up (PLU) data file.

RFID technology provides an alternative to bar code reader technology for distinguishing and recording items for purchase. Some of the uses of RFID technology are disclosed in U.S. Pat. No. 6,019,394 assigned to the assignee of the present invention. This patent is hereby incorporated by reference.

Store associates must perform routine tasks throughout the store and require information to support operation of the store. Back room inventory management is on routine task which can be labor intensive. Store associates must routinely track movement of stock in and out of the back room, including time and location on back room shelves.

Therefore, it would be desirable to combine the communication capabilities of electronic price label systems with RFID technology in order to perform back room inventory management.

SUMMARY OF THE INVENTION

In accordance with the teachings of the present invention, a system and method of managing inventory is provided.

The system includes an electronic shelf label (ESL) system including an ESL, a radio frequency identification (RFID) label interrogator associated with the ESL, first and second groups of RFID labels attached to first and second groups of items associated with the ESL, and a computer.

The computer obtains identification information and location information for the ESL, sends a first message to the ESL to activate the first group of RFID labels, obtains first RFID label information from the first RFID labels through the ESL system, stores the first RFID label information in a record, sends a second message to the ESL to activate second group of RFID labels, obtains second RFID label information from the second RFID labels through the ESL system, compares the first and second RFID label information, removes third RFID label information within the first RFID label information from the record if the second RFID label information does not contain the third RFID label information, and adds fourth RFID label information representing a difference between the first and second RFID label information to the record.

The computer may additionally store first times in the record with the first RFID label identification, determine second times with the second RFID label information, and subtract the first times from the second times to determine third times spent by the first items on a shelf.

The computer may additionally determine an average time spent on the shelf by the first items from the third times.

It is accordingly an object of the present invention to provide a system and method of managing inventory.

It is another object of the present invention to provide a system and method of managing back room inventory which combines communication capabilities of electronic price label systems with RFID technology.

It is another object of the present invention to reduce the amount of time spent in manually tracking time and location information for items.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
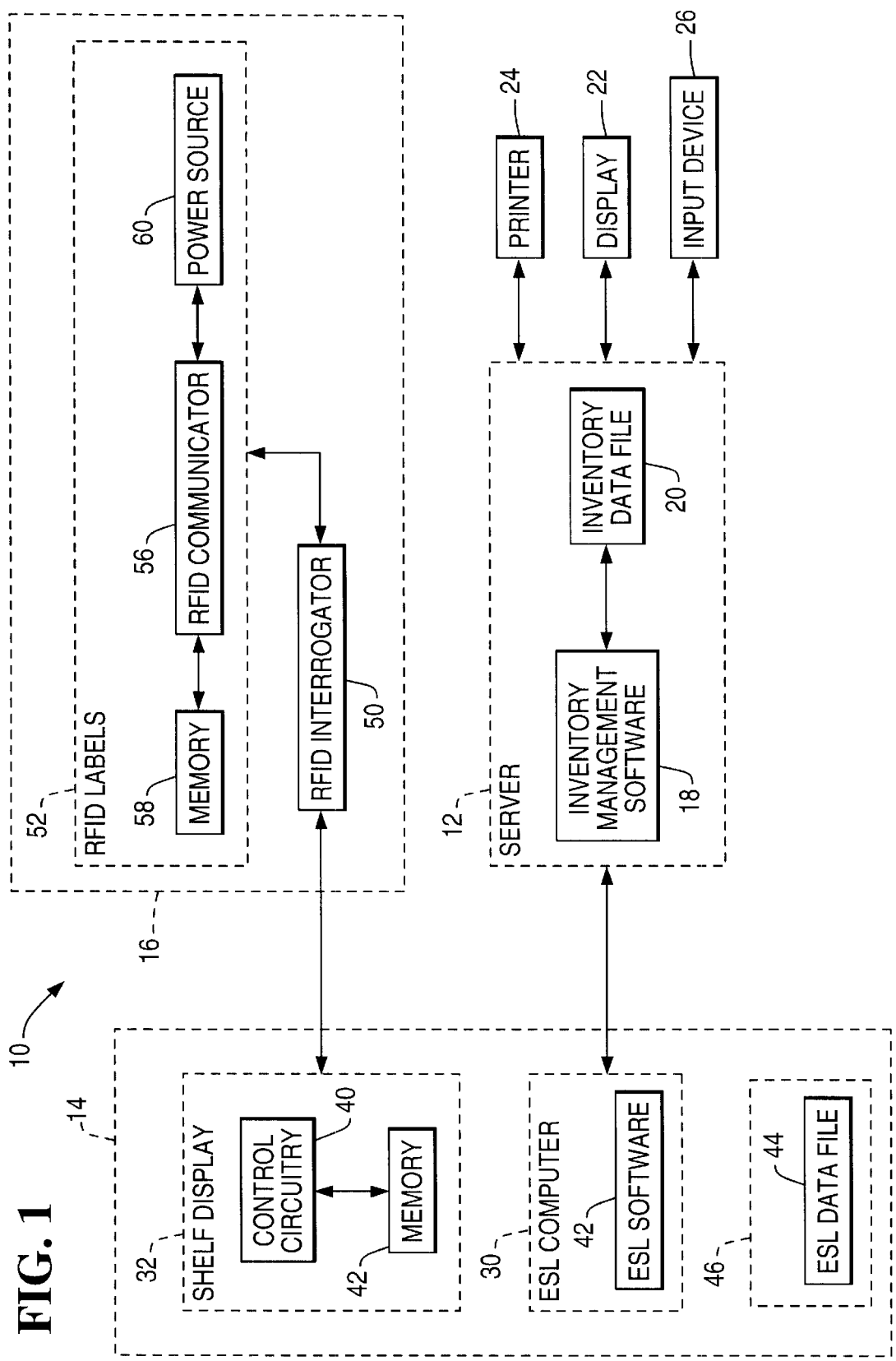
FIG. 1 is a block diagram of a transaction processing system.

Referring now to FIG. 1, back room system 10 primarily includes server 12, electronic shelf label (ESL) system 14, and radio frequency identification (RFID) system 16.

Server 12 executes inventory management software 18 which tracks locations of inventory items on back room shelves inventory management software 18 additionally tracks time spent on back room shelves by such inventory items. Inventory management software 18 may also generate an order stock to replace items which have been removed from back room shelves.

Inventory management software 18 stores inventory information within inventory data file 20. Inventory management software 18 obtains the inventory information from RFID system 16.

Inventory management software 18 provides reports which may be displayed by display 22 or printed by printer 24. A store employee may manage reporting and data entry through input device 26, which may include a keyboard.

ESL system 14 includes ESL computer 30 and ESLs 32. Communication between ESL computer 30 and ESLs 32 may be wireless or wired communication.

ESL computer 30 executes ESL software 34. ESL software 34 is responsible for scheduling and transmitting messages to ESLs 32. ESL software 34 maintains ESL data file 44 which includes ESL identification information, item identification information, and price verification information. ESL software 34 stores ESL data file 44 within storage medium 46.

ESL software 34 periodically sends messages to ESLs 32 requesting information about items associated with ESLs 32. ESLs 32 obtain the information using RFID system 16. ESL software 34 forwards received information to inventory management software 18.

ESLs 32 are mounted to back room shelves. ESts include control circuitry 40 and memory 42. Control circuitry 40 controls operation of ESL 32. Control circuitry 40 receives incoming messages from ESL computer 30 and acknowledges messages from ESL computer 30. Control circuitry 40 also receives information from RFID system 16 and stores the shelf inventory information in memory 42 until it can be sent to ESL computer 30.

RFID system 16 includes RFID interrogators 50 and RFID labels 52.

RFID interrogators 50 are coupled to ESLs 32. RFID interrogators 50 are mounted on shelves with ESLs 32. Alternatively, RFID interrogators 50 may be built into ESLs 32. RFID interrogators 50 receive RFID label information from bearing RFID labels 52 on nearby items associated with ESLs 32.

RFID labels 52 store information about items and communicate the information to RFID interrogators 50. One embodiment of RFID label 52 is active and includes RFID communicator 56, memory 58, and power source 60. RFID communicator 56 sends item information stored in RFID memory 58 to RFID interrogators 50. RFID communicator 56 may include an RF transceiver.

Memory 58 stores the information and may include a read-only memory (ROM) for one-time use, or a programmable ROM (EPROM) for repeated use.

Power source 60 may include a battery.

RFID label 52 may also be a passive label. Passive RFID labels use very little energy and may only include RFID communicator 56. Power may be derived from radio waves.

RFID communicator 56 may include a reflective antenna which has a frequency which is unique among RFID labels 52. RFID communicator 56 communicates RFID label identification information which must be cross-referenced to obtain item identification information. RFID communicator 56 may include a number of antennas, such as conductive ink antennas.

RFID labels 52 may vary in size, depending upon product size, and may be visible or hidden when attached to products. RFID label 52 may be removably or permanently attached to products.

Figure 2:
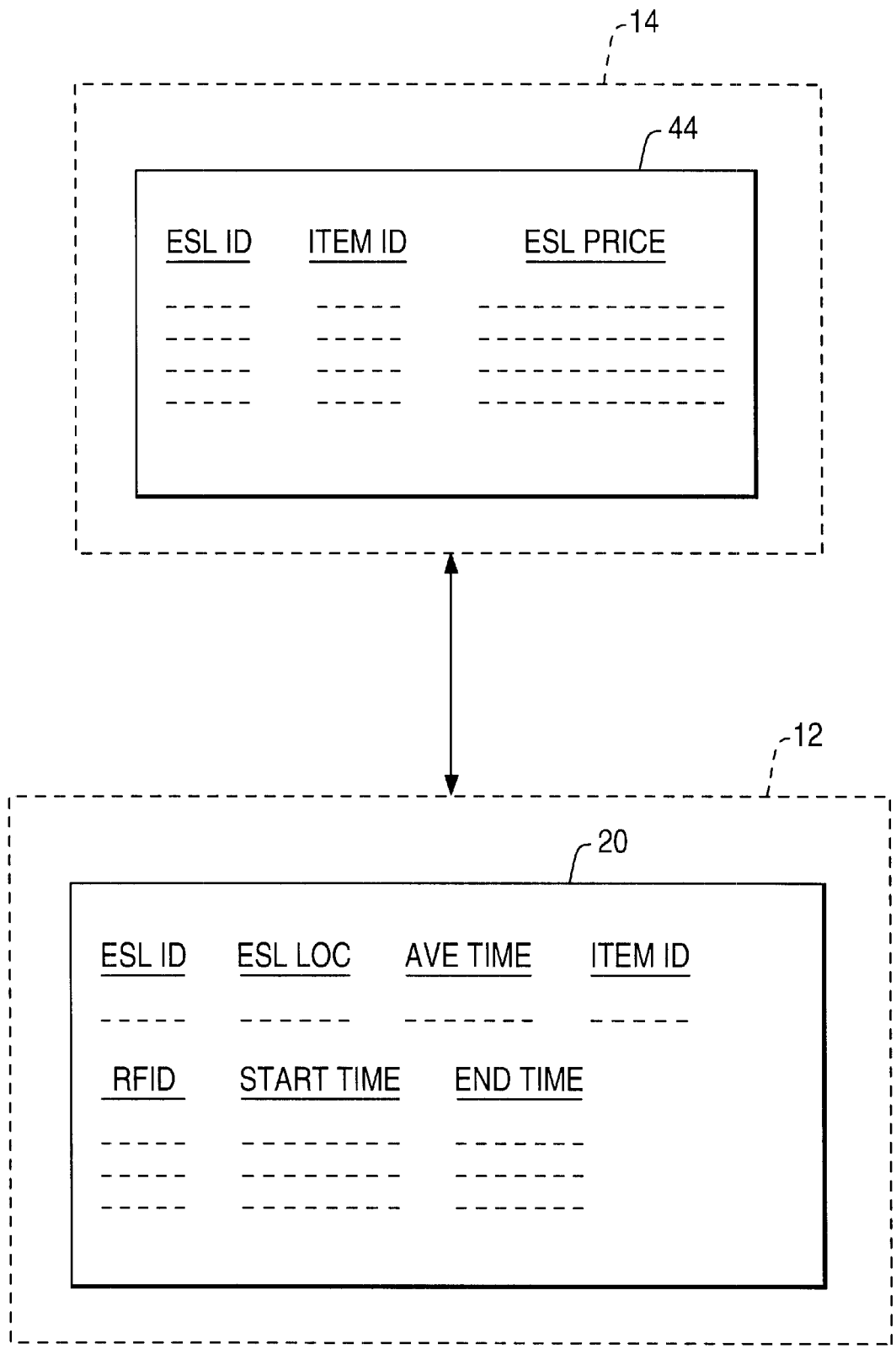
FIG. 2 illustrates the contents of example data files.

Turning now to FIG. 2, inventory data file 20 and ESL data file 44 are shown in more detail.

Inventory data file 20 includes records for each ESL 32. The entries include ESL ID, ESL LOC, AVE TIME, RFID, INIT TIME, and END TIME.

Entry ESL ID identifies ESL identification information.

Entry ESL LOC identifies ESL location information.

Entry AVE TIME identifies average time of an item on a back room shelf.

Entry RFID identifies RFID label identification information.

Entry START TIME identifies start time of an item on a back room shelf.

Entry END TIME identifies end time of an item on a back room shelf.

Inventory data file 20 may additionally include entry ITEM ID, which identifies an item associated with ESL 32. Item identification information may come from RFID label 52 or from ESL data file 44 or by manually entered using input device 26.

ESL data file 44 includes records for each ESL 32. The entries include ESL ID, ITEM ID, and ESL PRICE.

Entry ESL ID identifies ESL identification information.

Entry ITEM ID identifies an item associated with ESL 32.

Entry ESL PRICE identifies a price verifier.

Figure 3A:
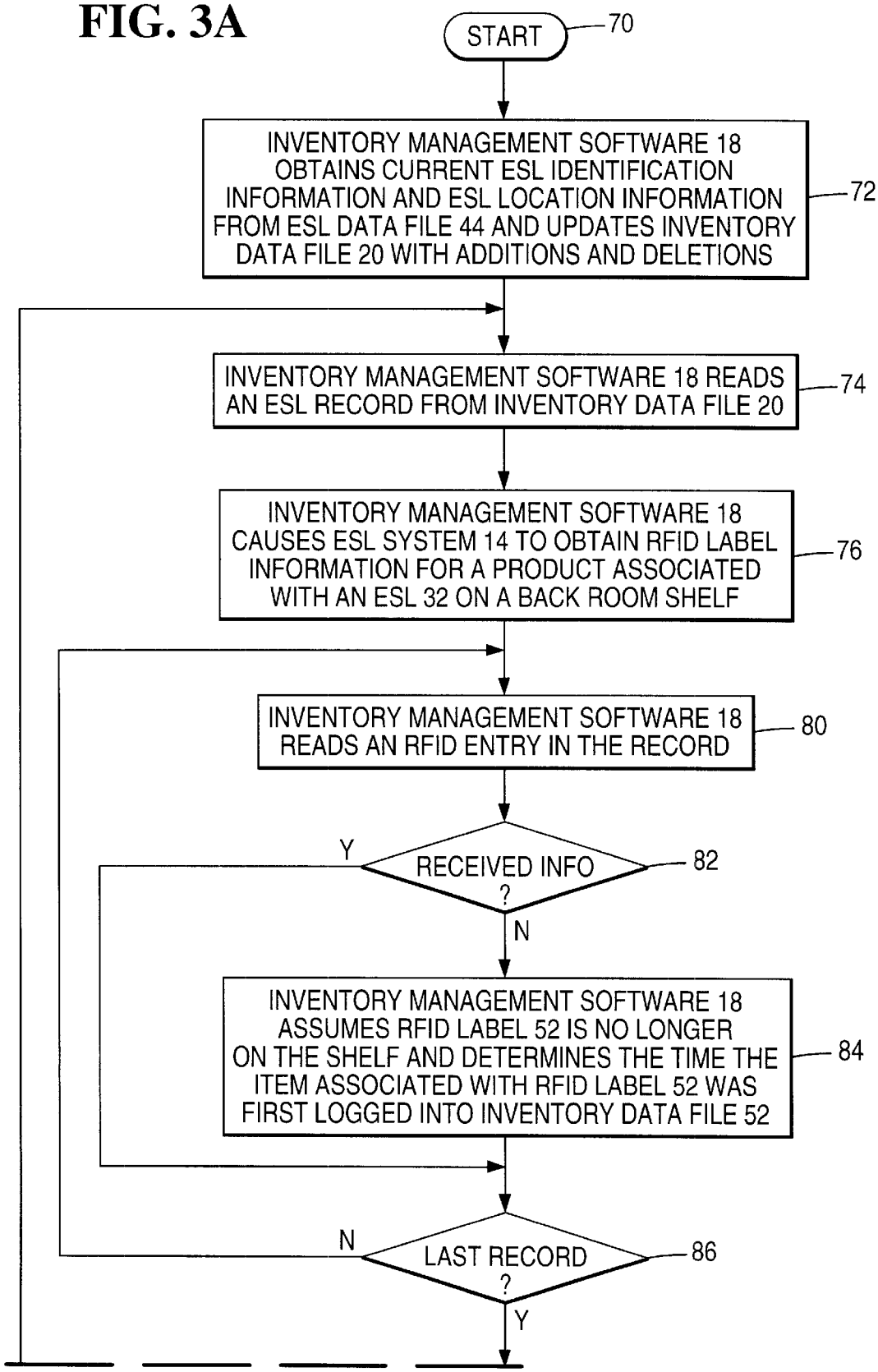
FIG. 3 is a flow diagram illustrating the method of the present invention.
Figure 3B:
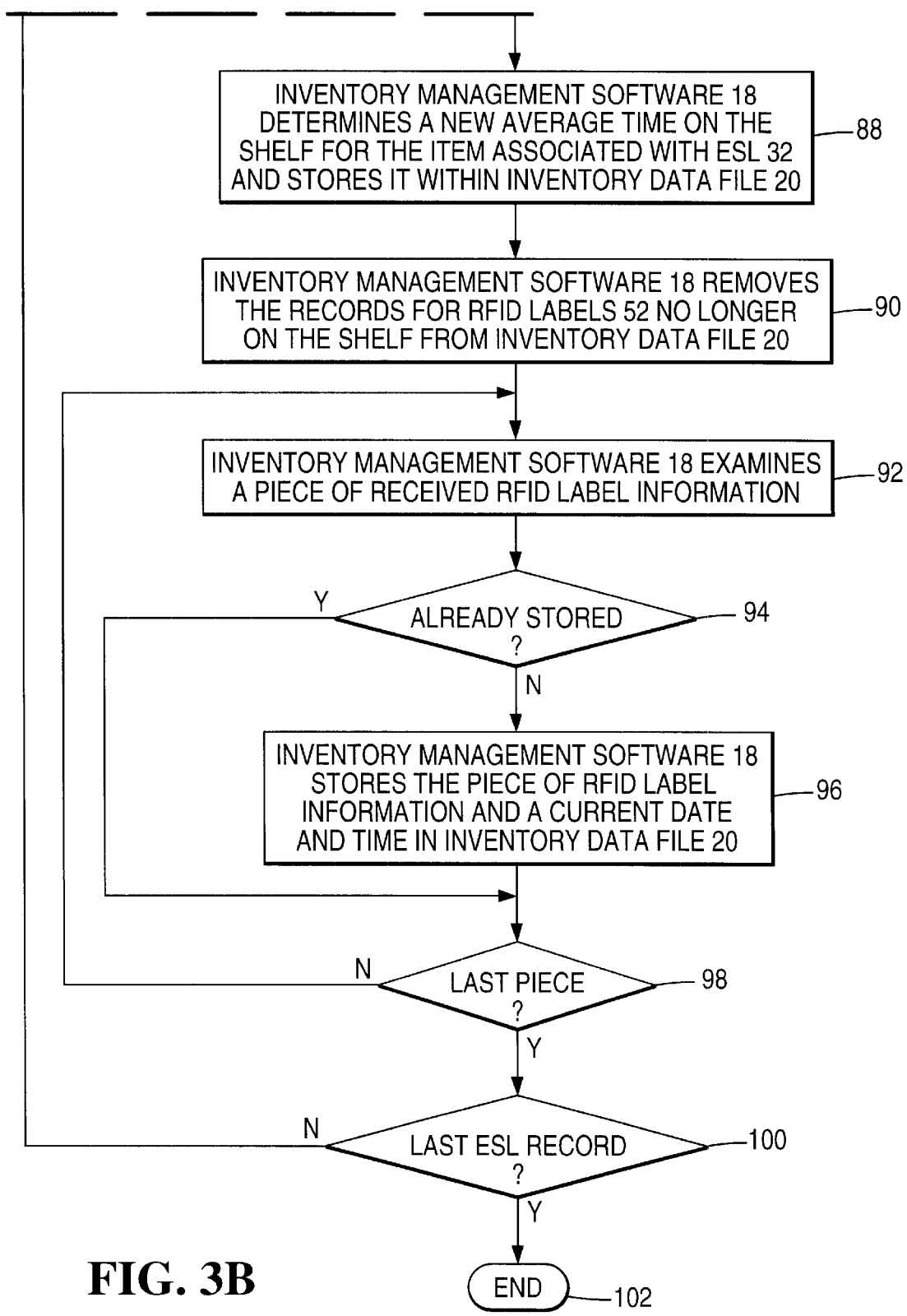

Turning now to FIG. 3, the inventory management method is illustrated in more detail beginning with START 70.

In step 72, inventory management software 18 obtains current ESL identification information and ESL location information from ESL data file 44 and updates inventory data file 20 with additions and deletions.

In steps 74–90, inventory management software 18 compares each piece of RFID label information listed in an ESL record in inventory data file 20 to received RFID label information.

In step 74, inventory management software 18 reads an ESL record from inventory data file 20.

In step 76, inventory management software 18 causes ESL system 14 to obtain RFID label information for a product associated with an ESL 32 on a back room shelf. ESL system 14 sends messages to ESL 32 with instructions to activate RFID interrogator 50, obtain RFID label information, and return the RFID label information. RFID interrogator 50 obtains the RFID label information from memories 58 of RFID labels 52 on the products and forwards the identification information to ESL 32 for transmission back to ESL computer 30.

The RFID label information preferably includes RFID label identification information, but may also include item identification information. Item identification information for products having passive RFID labels 52 may be entered manually in inventory data file 20 and cross-referenced to RFID label identification information by inventory management software 18.

ESL software 34 forwards the RFID label information to inventory management software 18.

In step 80, inventory management software 18 reads an RFID entry in the record.

In step 82, inventory management software 18 determines whether it received a piece of RFID label information for the RFID label 52 in the record. If not, operation proceeds to step 84. Otherwise, operation proceeds to step 86.

In step 84, inventory management software 18 assumes RFID label 52 is no longer on the shelf and determines the time the item associated with RFID label 52 was first logged into inventory data file 52.

In step 86, inventory management software 18 determines whether the record is the last record. If not, operation returns to step 80. Otherwise, operation proceeds to step 88.

In step 88, inventory management software 18 determines a new average time on the shelf for the item associated with ESL 32 and stores it within inventory data file 20.

In step 90, inventory management software 18 removes the records for RFID labels 52 no longer on the shelf from inventory data file 20.

In steps 92–98, inventory management software 18 identifies new pieces of RFID label information.

In step 92, inventory management software 18 examines a piece of received RFID label information.

In step 94, inventory management software 18 determines whether the piece of received of RFID label information is already stored within inventory data file 20. If so, operation proceeds to step 98. Otherwise, operation proceeds to step 96.

In step 96, inventory management software 18 stores the piece of RFID label information and a current date and time in inventory data file 20.

In step 98, inventory management software 18 determines whether the piece of RFID label information is the last piece. If not, operation returns to step 92. Otherwise, operation proceeds to step 100.

In step 100, inventory management software 18 determines whether the ESL record is the last ESL record. If not, operation returns to step 74. Otherwise, operation proceeds to step 102.

In step 102, operation ends.

Using the information in inventory data file 20, store management can easily track locations of items bearing RFID labels 52. They can also track time spent on shelves by such items.

Although the present invention has been described with particular reference to certain preferred embodiments thereof, variations and modifications of the present invention can be effected within the spirit and scope of the following claims.

I claim:

1. An inventory management method comprising the steps of:
   (a) obtaining identification information and location information for an electronic shelf label (ESL);
   (b) sending a first message to the ESL to activate a first radio frequency identification (RFID) label on a first item associated with the ESL using an RFID label interrogator associated with the ESL;
   (c) obtaining first RFID label information from the first RFID label by the ESL;
   (d) storing the first RFID label information in a record;
   (e) sending a second message to the ESL to activate a second RFID label on a second item associated with the ESL using the RFID label interrogator;
   (f) obtaining second RFID label information from the second RFID label by the ESL;
   (g) comparing the first and second RFID label information;
   (h) removing the first RFID label information from the record if the second RFID label information does not contain the first RFID label information; and
   (i) adding third RFID label information representing a difference between the first and second RFID label information to the record.

2. The method as recited in claim 1, further comprising the steps of:
   (j) storing a first time in the record with the first RFID label identification;
   (k) determining a second time with the second RFID label information; and
   (l) subtracting the first time from the second time to determine a third time spent by the first item on a shelf.

3. An inventory management method comprising the steps of:
   (a) obtaining identification information and location information for an electronic shelf label (ESL);
   (b) sending a first message to the ESL to activate first radio frequency identification (RFID) labels on first items associated with the ESL using an RFID label interrogator associated with the ESL;
   (c) obtaining first RFID label information from the first RFID labels by the ESL;
   (d) storing the first RFID label information in a record;
   (e) sending a second message to the ESL to activate second RFID labels on second items associated with the ESL using the RFID label interrogator;
   (f) obtaining second RFID label information from the second RFID labels by the ESL;
   (g) comparing the first and second RFID label information;
   (h) removing third RFID label information within the first RFID label information from the record if the second RFID label information does not contain the third RFID label information; and
   (i) adding fourth RFID label information representing a difference between the first and second RFID label information to the record.

4. The method as recited in claim 3, further comprising the steps of:
   (j) storing first times in the record with the first RFID label identification;
   (k) determining second times with the second RFID label information; and
   (l) subtracting the first times from the second times to determine third times spent by the first items on a shelf.

5. The method as recited in claim 4, further comprising the step of:
   (m) determining an average time spent on the shelf by the first items from the third times.

6. An inventory management system comprising:
   an electronic shelf label (ESL) system including an ESL;
   a radio frequency identification (RFID) label interrogator associated with the ESL;
   first and second groups of RFID labels attached to first and second groups of items associated with the ESL; and
   a computer which obtains identification information and location information for the ESL, sends a first message to the ESL to activate the first group of RFID labels, obtains first RFID label information from the first RFID labels through the ESL system, stores the first RFID label information in a record, sends a second message to the ESL to activate second group of RFID labels, obtains second RFID label information from the second RFID labels through the ESL system, compares the first and second RFID label information, removes third RFID label information within the first RFID label information from the record if the second RFID label information does not contain the third RFID label information, and adds fourth RFID label information representing a difference between the first and second RFID label information to the record.

7. The system as recited in claim 6, wherein the computer additionally stores first times in the record with the first RFID label identification, determines second times with the second RFID label information, and subtracts the first times from the second times to determine third times spent by the first items on a shelf.

8. The system as recited in claim 7, wherein the computer additionally determines an average time spent on the shelf by the first items from the third times.

* * * * *